United States Patent [19]

Janik et al.

[11] 4,455,821

[45] Jun. 26, 1984

[54] 101 ELECTRONIC FUEL CONTROL IGNITION INTERLOCK

[75] Inventors: Stanley G. Janik, Huntington; Kimball J. Rumford, Fairfield, both of Conn.

[73] Assignee: Avco Corporation, Stratford, Conn.

[21] Appl. No.: 461,317

[22] Filed: Jan. 27, 1983

[51] Int. Cl.³ .............................................. F02G 7/264
[52] U.S. Cl. ................................ 60/39.091; 60/39.141
[58] Field of Search .......... 60/39.091, 39.141, 39.281, 60/39.821, 39.827

[56] References Cited

U.S. PATENT DOCUMENTS 2,730,862  1/1956  Lamy ............................. 60/39.141
3,834,361  9/1974  Keely ............................. 60/39.281

*Primary Examiner*—Louis J. Casaregola
*Attorney, Agent, or Firm*—Ralph D. Gelling

[57] ABSTRACT

A simple continuity circuit is provided interconnecting the connector bodies of a wiring harness which directs the signal from the computer control of a gas turbine engine to the fuel metering unit of said engine. The continuity circuit forms part of the ignition exciter circuit and acts to de-energize the exciter when the wiring harness is not in place. This prevents ignition when the failure mode of the fuel metering unit is directing a fuel flow to the combustor which is excessive for safe start-up.

3 Claims, 2 Drawing Figures

101 ELECTRONIC FUEL CONTROL IGNITION INTERLOCK

BACKGROUND OF THE INVENTION

The fuel flow to the combustor of a gas turbine engine is generally controlled by a mechanical valve which is responsive to a signal from a central computer control for the engine. Where such an engine is used in an aircraft, there is a critical need for continuous fuel flow inspite of a failure of the computer control. For this reason, the fuel flow unit is constructed with a failure mode of operation which is initiated by the absence of a fuel flow signal from the computer. In the failure mode the fuel flow unit will provide a predetermined amount of fuel flow in order to keep the engine running. This works fine when a computer failure occurs in flight, but there are instances where a failure may arise prior to start-up. The fuel flow called for in the failure mode is much greater than is required for normal start-up and idle operation. If the pilot is unaware of the failure, his normal ignition procedure could result in an explosion, fire, or severe over temperature. For this reason, it is the purpose of this invention to provide a means by which the ignition circuit is deactivated when a computer failure to the fuel control unit exists prior to engine start-up.

SUMMARY OF THE INVENTION

It has been found that most of the computer failures which occur prior to start-up are the result of improper or incomplete installation of the electronic wiring harness after maintenance. Simply, someone fails to plug in a related connector. In order to prevent ignition when a connector is left in the open condition, the ignition exciter circuit is connected in series through the connectors which may initiate the failure mode, namely, the connectors from the control computer and to the fuel metering unit. In this manner, the exciter circuit forms a continuity check for the critical connectors and prevents start-up when the fuel metering unit is in its failure mode.

DESCRIPTION OF THE DRAWING

The invention is described in more detail below with reference to the attached drawing in which.

DESCRIPTION OF THE PREFERRED EMBODIMENT

Figure 1:
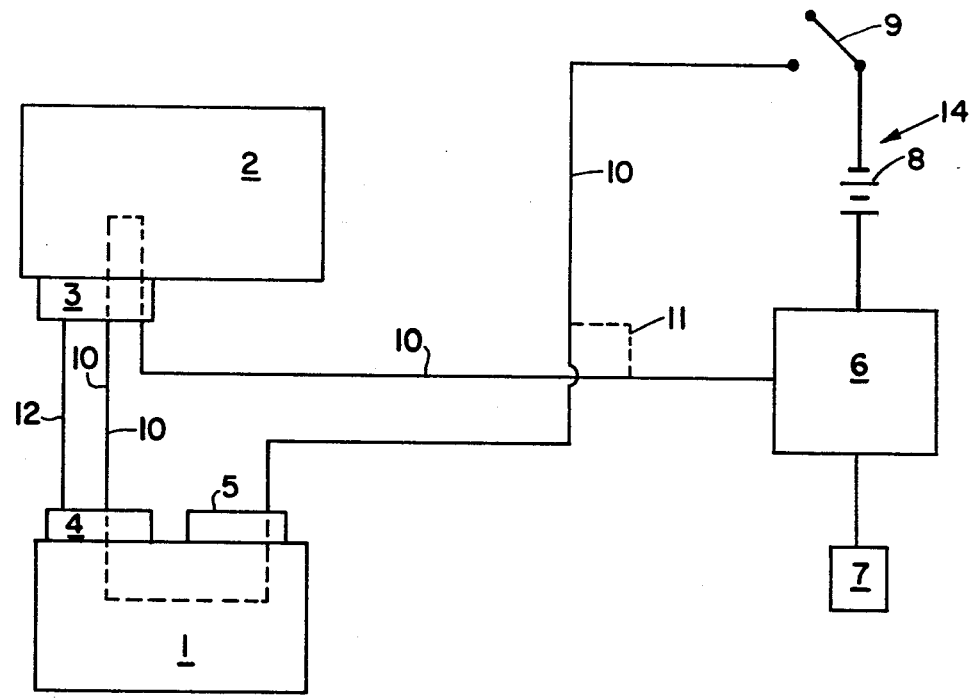
FIG. 1 is a schematic diagram showing the igniter circuit incorporating the invention and showing in phantom the exciter circuit of the prior art.
Figure 2:
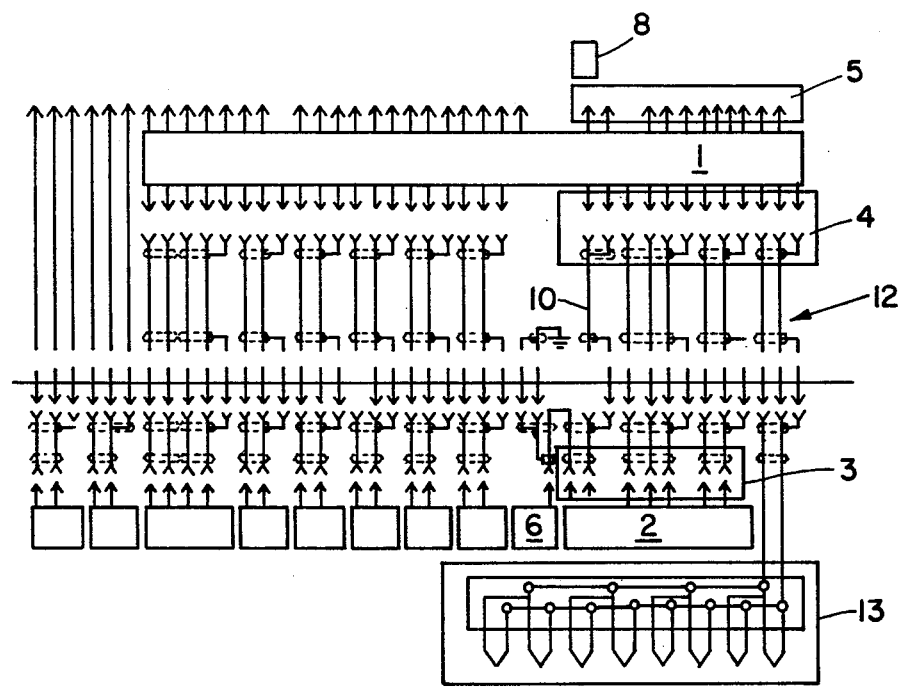
FIG. 2 is a schematic diagram of a typical wiring harness incorporating this invention.

Referring first to FIG. 1, there is shown the basic connections between a control computer 1 and the fuel metering unit 2 of a gas turbine engine 13. This circuit involves a wiring harness 12 utilizing pin and socket-type connectors 3, 4 and 5. As is shown in FIG. 2, there are many different circuits served by the connectors 3, 4 and 5 and wiring harness 12, but this invention only involves those systems which would have the effect of removing the input signals to the fuel metering unit 2 and thereby initiating the fixed fuel flow of the failure mode.

The igniter circuit 14 is powered by a direct current source 8 to ignition exciter 6. Ignition exciter 6 fires the spark plugs 7 to initiate combustion of the fuel in the combustor. In the prior art, as shown by the phantom connection 11, actuation of the pilot's switch 9 would directly ignite the spark plugs 7 to start the engine. If the connectors 3, 4 or 5 are disconnected or misconnected, the fuel metering unit 2 will not receive its proper signal and will revert to its failure mode. The fuel flow will therefore be excessive for the starting conditions and damage to the engine may result from fire, explosion or overheating.

This invention will relieve this condition in all cases where the failure is the result of omissions involving connectors 3, 4 and 5. Igniter circuit 14 is connected through line 10 to the connectors 3, 4 and 5 by the use of additional connecting pins in each of these connectors. The ignition circuit 14 therefore includes, in series, connecting points at each of the connectors and it can be readily observed that continuity must be present in order that the exciter 6 be energized. If the connectors 3, 4 and 5 are not in their proper place, the circuit 14 will be deactivated and start-up cannot occur until the situation is corrected. In this manner, a very simple device is provided which will eliminate the start-up problem in a great majority of the cases.

We claim:

1. In a fuel control system which governs the flow of fuel to the combustor of a gas turbine engine on the basis of signals supplied from a control computer to a fuel metering unit, wherein said fuel metering unit operates to provide a predetermined fuel flow upon failure of the signal from the computer, an ignition exciter circuit comprising:
    an ignition exciter connected to activate a spark plug in the combustor of the gas turbine engine to initiate combustion of the fuel in the combustor;
    a source of direct current connected to the ignition exciter;
    a manually operated switch to close the ignition exciter circuit; and
    a wiring harness interconnecting the control computer with the fuel metering unit through at least one connector assembly, said connector assembly including means connected in the ignition exciter circuit to open said circuit and prevent ignition actuation when said connector is improperly installed.

2. In a fuel control system which governs the flow of fuel to the combustor of a gas turbine engine on the basis of signals supplied from a control computer to a fuel metering unit, wherein said fuel metering unit operates to provide a predetermined fuel flow upon failure of the signal from the computer, an ignition exciter circuit as described in claim 1 wherein the wiring harness is connected through a plurality of connector assemblies, each of said assemblies being connected in series in the ignition exciter circuit.

3. In a fuel control system which governs the flow of fuel to the combustor of a gas turbine engine on the basis of signals supplied from a control computer to a fuel metering unit, wherein said fuel metering unit operates to provide a predetermined fuel flow upon failure of the signal from the computer, an ignition exciter circuit comprising:
    an ignition exciter circuit as described in claim 1 wherein the connecting means comprises an extra pin and socket in each connector assembly which is connected in the exciter circuit.

* * * * *